United States Patent [19]

Schwartz et al.

[11] Patent Number: 4,931,525
[45] Date of Patent: Jun. 5, 1990

[54] OPTICAL ACTIVE (METH)ACRYLAMIDES AND POLYMERS THEREOF FOR RACEMATE RESOLUTION

[75] Inventors: Ulrich Schwartz; Rolf Grosser, both of Leverkusen; Karl-Erwin Piejko, Cologne; Bruno Bömer, Bergisch Gladbach; Dieter Arlt, Cologne, all of Fed. Rep. of Germany

[73] Assignee: Bayer Aktiengesellschaft, Leverkusen, Fed. Rep. of Germany

[21] Appl. No.: 274,063

[22] Filed: Nov. 21, 1988

Related U.S. Application Data

[60] Division of Ser. No. 925,340, Oct. 31, 1986, abandoned, which is a continuation-in-part of Ser. No. 904,734, Sep. 5, 1986, abandoned.

[30] Foreign Application Priority Data

Sep. 11, 1985 [DE] Fed. Rep. of Germany ....... 3532356

[51] Int. Cl.$^5$ ................. C08F 120/54; C07C 103/133
[52] U.S. Cl. .................................... 526/305; 564/303; 564/204; 564/217; 564/304
[58] Field of Search ...................... 564/304, 317, 217; 526/305, 204

[56] References Cited

U.S. PATENT DOCUMENTS 4,138,542  2/1979  Sieget et al. .................... 526/305

FOREIGN PATENT DOCUMENTS 0121618 10/1984 European Pat. Off. .
0218089  4/1987 European Pat. Off. .
2500523  7/1976 Fed. Rep. of Germany .
0013416 12/1979 Fed. Rep. of Germany ...... 564/204
3532356  3/1987 Fed. Rep. of Germany ...... 564/204
2354351  1/1978 France .

OTHER PUBLICATIONS

Makromol. Chem. Rapid Commun 1, 85–89 (1980) Blaschke et al.
Chemical Society Journal (London/pp. 2168–2170, 2222 Reed et al (1926).

John Read et al, "Researches in the Menthone Series . . . ", J. Chem. Soc. London (1927), pp. 2168–2170.
Feltkamp et al, "Synthese und Trennung der 8 Menthyl- und Carvomenthylamine", Liebigs Ann. Chem. 707, p. 78.
Streitwieser et al, "Organische Chemie", Verlag Chemie (1980), p. 140.

*Primary Examiner*—Joseph L. Schofer
*Assistant Examiner*—Peter F. Kulkosky
*Attorney, Agent, or Firm*—Sprung Horn Kramer & Woods

[57] ABSTRACT

In the chromatographic separation of a mixture of antipodes of optically active chemicals by passing a solution of such mixture over an optically active adsorbent to effect adsorption, and then eluting the adsorbed material, the improvement which comprises employing as the adsorbent particles of an optically active and cross-linked polymer containing the repeating structural unit

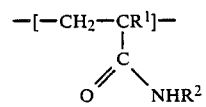

in which
$R^1$ represents hydrogen or methyl, and
$R^2$ represents one of the stereoisomers of the eight possible stereoisomeric forms of each of the optically active radicals of the formulae

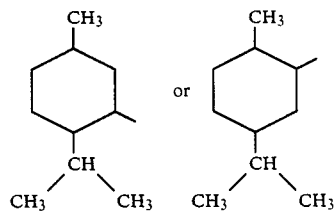

Improved separation results. The pure monomers are also new.

11 Claims, No Drawings

OPTICAL ACTIVE (METH)ACRYLAMIDES AND POLYMERS THEREOF FOR RACEMATE RESOLUTION

This is a division of application Ser. No. 925,340, filed Oct. 31, 1986, now abandoned, which is a continuation-in-part of application Ser. No. 904,734, filed Sept. 5, 1986, now abandoned.

The invention relates to optically active (meth)acrylamides, the optically active polymers prepared therefrom, processes for the preparation of the optically active monomers and polymers, and the use of the polymers as adsorbents, in the particular as the stationary phase for chromatographic racemate resolution.

The separation of racemic mixtures into the antipodes represents a considerable problem in preparative chemistry. Chromatographic separation methods using optically active adsorbents as stationary phase are becoming increasingly important for this purpose. However, the results hitherto have been less than satisfactory. Thus, the separating effect of the optically active adsorbents which are disclosed in DE-OS (German Published Specification) No. 2,500,523 is, for some racemates of certain classes of substances, so small that there are clear limits to the industrial applicability of a racemate resolution of this type.

It has now been found that an especially good separation efficiency can be obtained by use of certain optically active (meth)acrylamide polymers.

Thus the invention relates to optically active (meth)acrylamide monomers of the general formula 1

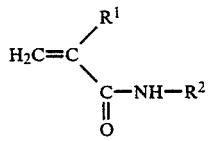
(1)

in which
$R^1$ represents hydrogen or methyl, and
$R^2$ represents one of the stereoisomers of the eight possible stereoisomeric forms of each of the optically active radicals of the formulae

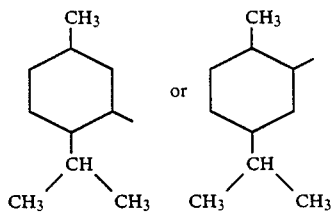

Preferred compounds of the formula 1 are those in which
$R^1$ represents hydrogen or methyl, and
$R^2$ represents one stereoisomer of the eight possible stereoisomeric forms, in each case, of the optically active radical of the structural formula

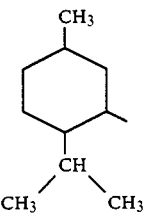

L-Menthyl(meth)acrylamide, d-menthyl(meth)acrylamide and d-neomenthyl(meth)acrylamide are particularly preferred.

The monomer according to the invention are obtained by reaction of optically active amines of the formula (2)

(2)

in which
$R^2$ has the abovementioned meaning, or of their acid addition products, with acrylic acid derivatives of the formula (3)

(3)

in which
X represents a group which can be eliminated, and
$R^1$ has the abovementioned meaning, where appropriate in the presence of a base, in inert organic solvents.

Groups which can be eliminated and which may be mentioned are: halogen, in particular chlorine or bromine, or a group of the formula $OR^3$, in which $R^3$ represents a $C_1$-$C_4$-alkyl group, or a

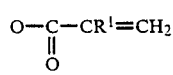

group. Furthermore, it is also possible to use unsymmetrical acid anhydrides.

The acrylic acid derivatives of the formula 3 which are used as starting materials are known [Beilsteins Handbuch der organischen Chemie (Beilstein's Handbook of Organic Chemistry), Volume 2, 3rd supplement, page 1293; Volume 2, original edition, page 400].

The optically active amines of the formula 2 which are used as starting materials are known or can be prepared by known methods (E. Beckmann, Liebigs Ann. Chem. 250, 322 ff (1889), H. C. Brown, P. C. Garg, J. Am. Chem. Soc. 83, 2952 (1961), F. Tutin, F. S. Kipping, J. Chem. Soc. London 85, 65–78 (1904), J. Read, Chem. Rev. 7, 1 (2930), H. Feltkamp, F. Koch und Tran Nhut Thanh, Liebigs Ann. Chem., 707, 78 (1967).

Suitable acid addition compounds of the amines used according to the invention are salts of these amines with inorganic or organic acids. Mineral acids such as, for example, hydrochloric acid, hydrobromic acid, sulphuric acid or phosphoric acid, methanesulphonic, ethanesulphonic, benzenesulphonic or toluenesulphonic acid, are preferred.

All inert organic solvents are suitable as solvents. Hydrocarbons such as, for example, benzene, toluene, xylene or petroleum fractions, or halogenated hydrocarbons such as, for example, dichloromethane, trichloromethane or tetrachloromethane, dichloroethane or trichloroethylene, are preferred.

The customary inorganic and organic bases are suitable as bases. Alkali metal or alkaline earth metal hydroxides such as, for example, sodium, potassium, lithium, calcium or barium hydroxide, alkali metal or alkaline earth metal carbonates such as, for example, sodium or potassium carbonate, alkali metal alcoholates such as, for example, sodium ethanolate, potassium ethanolate, sodium methanolate or potassium methanolate, or amines such as, for example, triethylamine, pyridine, morpholine or piperidine, are preferred.

The reaction temperatures can be varied within a relatively wide range. In general they are in the range from $-20°$ C. to $+100°$ C., preferably from $-10°$ C. to $+60°$ C.

The reaction can be carried out under atmospheric, elevated or reduced pressure. In general it is carried out under atmospheric pressure.

The compounds of the formulae 2 and 3 are preferably used in equimolar ratios.

The invention also relates to optically active crosslinked polymers which contain the repeating structural unit

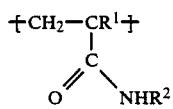

These polymers have the following properties:

$$\left[\frac{\text{Volume swollen}}{\text{Volume unswollen}}\right]: \text{1.1–5; preferably 1.4–4; particularly preferably 2–3,}$$

measured in toluene/ethyl acetate (ratio by volume 3:2) bulk volume [ml/g]: 1.5–2.5; preferably 1.6–2; particularly preferably 1.6–1.8, particle size distribution [$\mu$m]: 1–500; preferably 1–200; particularly preferably 1–100, nitrogen content [%] (without N in the crosslinker): 3.5–6.3, preferably 4.5–6.2; particularly preferably 5.5–6; nitrogen content [%] (with N in the crosslinker): 6.3–13; preferably 6.5–10; particularly preferably 6.5–7.5, These polymers according to the invention are prepared by polymerization, in a manner known per se, of the monomer of the formula 1 with 0.5 to 50 mol-%, preferably with 1 to 20 mol-%, in particular with 5 to 15 mol-% (relative to 1 mol of monomer) of a suitable crosslinker.

The invention preferably relates to a process in which the polymerization is carried out as suspension polymerization using an inert organic phase and an aqueous solution of a protective colloid.

The invention particularly relates to a process in which the suspension polymerization is carried out using toluene or chloroform as inert organic phase and an aqueous solution of a protective colloid consisting of a copolymer of methacrylic acid with methyl methacrylate as aqueous phase.

The suspension polymerization of the monomers according to the invention, of the formula I, can also be carried out, in a manner known per se, in the presence of an additional radical-forming agent.

Suitable crosslinking agents are compounds which contain at least two polymerizable vinyl groups. Preferred crosslinking agents are alkanediol diacrylates having about 8 to 12, preferably having 8 to 10, carbon atoms, such as, for example, 1,4-butanediol diacrylate, 1,3-propanediol diacrylate or 1,2-ethylene glycol diacrylate, or alkanediol dimethacrylates having about 10 to 14, preferably having 10 to 12, carbon atoms, such as, for example, 1,4-butanediol dimethacrylate, 1,3-propanediol dimethacrylate or 1,2-ethylene glycol dimethacrylate, aromatic divinyl compounds such as, for example, divinylbenzene, divinylchlorobenzene or divinyltoluene, vinyl esters of alkanedicarboxylic acids having about 8 to 14, preferably having 8 to 10, carbon atoms, such as, for example, divinyl adipate, divinyl benzenedicarboxylate, divinyl terephthalate, N,N'-alkylenediarylamides having about 8 to 12, preferably having 8 to 10, carbon atoms, such as, for example, N,N'-methylenediacrylamide, N,N'-ethylenediacrylamide, N,N'-methylenedimethacrylamide or N,N'-ethylenedimethacrylamide.

Suitable radical-forming agents are the customary radical-forming agents. Peroxides such as, for example, dibenzoyl peroxide, dilauroyl peroxide or di-orthotolyl peroxide, or azo compounds such as, for example, azobisisobutyronitrile (AIBN), are preferred.

The reaction components are dissolved in an organic solvent, preferably an aromatic hydrocarbon, such as benzene or toluene, or a halogenated hydrocarbon, such as dichloromethane, trichloromethane, tetrachloromethane or 1,2-dichloroethane.

It has proved to be advantageous for this to use as little solvent as possible. The lowermost limit of this is determined by the solubility of the monomers. It is particularly advantageous to use about 1 part by weight of solvent for each part by weight of monomer, or sufficient solvent just to dissolve the monomers. The organic phase is thoroughly dispersed in an aqueous solution of a protective colloid, preferably in an aqueous solution of a copolymer of methacrylic acid and methyl methacrylate, using an efficient stirrer. About 1 to 20, preferably about 2 to 10, parts by weight of the aqueous phase are used for each part by weight of organic phase. The stirred mixture is heated under an inert gas atmosphere, preferably under nitrogen, at temperatures between 30° C. and 100° C., preferably between 40° C. and 80° C. The polymerization time is between 4 and 12, preferably between 4 and 8, hours. The copolymer obtained in this manner is removed from the reaction mixture by filtration, purified by thoroughly washing with water and with organic solvents such as methanol, ethanol, benzene, toluene, dichloromethane, trichloromethane or acetone, and is then dried.

The polymer which is particularly preferably prepared by the process described above is that of L-d-menthyl(meth)acrylamide or d-neomenthyl(meth)acrylamide.

The invention also relates to the use of the polymers according to the invention for the chromatographic separation of racemic mixtures into the optical antipodes.

In particular, the invention relates to the use of the polymers according to the invention for the chromatographic resolution of active compound racemates into the optical antipodes, such as, for example, derivatized aminoacids, $\beta$-lactam compounds, pyrethroids, pyrethroid acids, monocyclic or bicyclic terpene derivatives, nitro- or cyanodihydropyridines, dihydropyridinecarboxylic acids, esters or amides, dihydropyridinelactones or sulphonyldihydropyridines.

Surprisingly, the polymers according to the invention have a better separation efficiency than those known from the state of the art. Thus, the optical yield on resolution of the racemate of methyl 1,4-dihydro-2,6-dimethyl-5-nitro-4-(2-trifluoromethylphenyl)-pyridinecarboxylate on the adsorbent according to the invention is 71% compared with 50% on the adsorbent which is disclosed in DE-OS (German Published Specification) No. 2,500,523 and consists of a copolymer of the (S)-1-phenylethylamide of methacrylic acid and 1,4-butanediol dimethylacrylate. Furthermore, the polymer according to the invention exhibits a good separation efficiency even on separation of relatively large amounts of racemic mixtures, which is a great advantage for industrial use.

The preparative separation of racemic mixtures into their optical antipodes using the polymers according to the invention is advantageously carried out by column chromatography. It is particularly advantageous in this to carry out the chromatographic separation with polymers which have been graded according to particle size, in order to obtain optimum separation efficiencies. Graded polymers of this type can be prepared in a manner known per se, for example by screening or air-sifting of the polymers according to the invention.

The methods of carrying out separation by column chromatography are familiar to the expert. Normally, the polymer is suspended in the mobile phase, and the suspension is introduced into a glass column. After the mobile phase has run out, the racemate which is to be resolved, dissolved in the smallest possible amount of mobile phase, is applied to the column. Then elution with the mobile phase is carried out, the eluate being collected in fractions as usual.

The mobile phases which are used are the customary organic solvents or mixtures of solvents which induce the polymer which is used as adsorbent to swell and which are able to dissolve the racemate which is to be resolved. Examples which may be mentioned in this context are: hydrocarbons such as benzene, toluene or xylene, ethers such as diethyl ether, dioxane or tetrahydrofuran, halogenated hydrocarbons such as dichloromethane or trichloromethane, acetone, acetonitrile or ethyl acetate, as well as mixtures of the said solvents.

Mixtures of toluene and ethyl acetate have proved to be especially suitable.

The composition of the mobile phase can be selected and optimized in a customary manner depending on the nature and property of the racemate which is to be resolved.

The separation efficiency of the polymer according to the invention is illustrated by means of a few racemates, using the capacity ratio $k'_1$ $k'_2$ and the enantioselectivity $\alpha$, $k'_1$, $k'_2$ and $\alpha$ being defined as follows:

$$\text{Capacity ratio } k'_{1(2)} = \frac{t_{1(2)} - t_0}{t_0}$$

$t_0 =$ retention time of unretained component of the separating column $t_{1(2)} =$ retention time of the enantiomer 1 which is eluted first, and of the enantiomer 2 which is eluted later, respectively.

$$\text{Enantioselectivity } \alpha = \frac{k'_2}{k'_1}$$

(I.) Preparation of (Meth)acrylamides

EXAMPLE 1

Preparation of l-Menthylmethacrylamide 194 g (1.86 mols of methacryloyl chloride are added dropwise over the course of 3 hours to 356 g (1.86 mols) of L-menthylamine hydrochloride and 376 g (3.71 mols) of triethylamine in 1.6 l of dichloromethane, while stirring at 0° C. The mixture is then stirred for 2 hours while warming to room temperature. The resulting triethylamine hydrochloride is filtered off with suction and washed with a little dichloromethane. The combined organic phases are washed twice with aqueous sodium chloride solution, dried over magnesium sulphate and evaporated in a rotary evaporator. The product is recrystallized from ethyl acetate or methanol/water or, after addition of a little 2,2'-methylene-bis-(4-methyl-6-tert.-butylphenol) is distilled under high vacuum at 140°–143 ° C.

Yield: 376 g (90% of theory)
Melting point: 79°–80 ° C.
Rotation: $[\alpha]_D^{20} = -87.1$ (c=1, CHCl$_3$):

EXAMPLE 2

Preparation of d-neomenthylmethacrylamide 104.5 g (1 mol) of methacrylic acid chloride are added dropwise to 191.7 g (1 mol) of d-neomenthylamine hydrochloride and 212.5 g (2.1 mols) of triethylamine in 780 ml of dichloromethane at room temperature. The mixture is stirred for a further 12 hours while heating to room temperature. It is washed three times with aqueous sodium chloride solution, the organic phase is dried over magnesium sulphate and evaporated in a rotary evaporator. The residue is recrystallized from ethyl acetate.

Yield: 194.5 g (27% of theory)
Melting point: 111°–112° C.
Rotation: $[\alpha]_D^{20} = +51.5°$ (C=1, CH$_2$Cl$_2$).

EXAMPLE 3

Preparation of l-menthylacrylamide 90.51 g (1 mol) of acrylic acid chloride are added dropwise to 155.3 g (1 mol) of l-menthylamine and 101.2 g (1 mol) of triethylamine in 400 ml of dichloromethane at 0° C. over the course of 3 hours. The mixtures is then stirred for 12 hours while warming to room temperature. It is washed three times with aqueous sodium chloride solution, the organic phase is dried over magnesium sulphate and evaporated in a rotary evaporator. The residue is recrystallized from acetonitrile.

Yield: 184.2 g (88% of theory).
Melting point: 136°–137 ° C.
Rotation $[\alpha]_D^{20} = -85.7°$ (C=1, CHCl$_3$).

II. Preparation of a bead polymer

EXAMPLE 4

Preparation of a bead polymer from l-menthylmethacrylamide

A solution of 90 g of L-menthylmethacrylamide, 10 g of ethylene glycol dimethylacrylate and 0.5 g of azobisisobutyronitrile in 100 g of trichloromethane is dispersed, at a stirrer speed of 320 rpm, in an aqueous phase composed of 450 ml of water and 200 ml of a 7.5% strength solution of a copolymer of equal parts by weight of methacrylic acid and methyl methacrylate (viscosity of the solution adjusted to pH 6 with NaOH: 3.6 Pa.s), and the dispersion is heated under nitrogen at 60° C. for 6 hours. The polymer is separated off by filtration, and fines are removed by sedimentation in water. It is washed with acetone and dried.

Yield: 77 g (77% of theory).
Properties:
(a) Before sedimentation: particle size distribution 1–100 μm.
(b) After sedimentation: particle size distribution 10–100 μm.
Degree of swelling (in toluene/ethyl acetate=3/2 (v/v): 2.4.
Bulk volume: 1.7 ml/g.
Nitrogen content: 5.62%.

EXAMPLE 5

Preparation of a bead polymer from d-neomenthylmethacrylamide

A solution of 18 g of d-neomenthylmethacrylamide, 2 g of ethylene glycol dimethacrylate and 0.1 g of azoisobutyric acid nitrile in 30 g of trichloromethane is dispersed with a stirring rate of 500 r.p.m. in an aqueous phase of 90 ml of demineralized water and 40 g of a 7% solution of a copolymer of identical parts by weight of methacrylic acid and methyl methacrylate (viscosity of the 7% solution adjusted to pH 6.5 with NaOH: 3,8 Pa.s) which was adjusted to pH 6.8 with NaOH and the mixture was polymerized under nitrogen for 2 hours at 55° C. and 7 hours at 60° C. The mixture is diluted with 2 l of water and the supernatant is decanted after the beads have settled. The settled beads are freed from all constituents which are smaller than 10 μm by repeated sedimentation and after being washed with acetone at 60° C. are dried to constant weight.

Yield: 16.2 g (81% of theory)
Properties:
(a) prior to sedimentation particle size distribution about 1–80 μm.
(b) after sedimentation: particle size distribution 10–80 μm.
Degree of swelling (in toluene/ethyl acetate 3:2, v:v): 153.
Bulk volume: 2.16 ml/g.
Nitrogen content: 5.6%.

EXAMPLE 6

Preparation of a bead polymer of l-menthylacrylamide

A solution of 84 g of l-menthylacrylamide, 10 g of ethylene glycol dimethylacrylate and 0.5 g of azobisisobutyronitrile in 100 g of trichloromethane is dispersed, at a stirrer speed of 320 rpm, in an aqueous phase composed of 450 ml of water and 200 ml of a 7.5% strength solution of a copolymer of equal parts by weight of methacrylic acid and methyl methacrylate (viscosity of the solution adjusted to pH 6 with NaOH: 3.6 Pa.s), and the dispersion is heated under nitrogen at 60° C. for 6 hours. The polymer is separated off by filtration, and fines are removed by sedimentation in water. It is washed with acetone and dried.

Yield: 74 g (80% of theory).
Properties:
(a) Before sedimentation: particle size distribution 1–100 μm.
(b) After sedimentation: particle size distribution 10–100 μm.
Degree of swelling (in toluene/ethyl acetate=3/2 (v/v): 2.5.
Bulk volume: 1.7 ml/g.
Nitrogen content: 5.27%.

III. Separations

The results of experiments on the chromatographic resolution of various racemates on an adsorbent consisting of the polymers described under II.) are detailed below (A) Separating column: 1.28 cm diameter, 32 cm packed height, 10 g polymer resin from Example 3

EXAMPLE 7

(±)-3-Methoxycarbonyl-2,2-dimethyl-cyclopropanecarboxylic acid.
Eluent=toluene:ethyl acetate=3:2.
$k'_1 = 4.23$.
$\alpha = 1.10$.

EXAMPLE 8

(±)-2-(4-Chlorophenyl)-3-methyl-butanoic acid.
Eluent=toluene:ethyl acetate=3:2.
$k'_1 = 2.46$.
$\alpha = 1.21$.

EXAMPLE 9

(±)-2,5,5-Trichloro-3,3-dimethyl-pentanoic acid.
Eluent=toluene:ethyl acetate=3:2.
$k'_1 = 4.50$.
$\alpha = 1.10$.

EXAMPLE 10

(±)-Cis-chrysanthemic acid.
Eluent=toluene:ethyl acetate=3:2.
$k'_1 = 1.00$.
$\alpha = 1.17$.

EXAMPLE 11

(±)-Trans-chrysanthemic acid.
Eluent=toluene:ethyl acetate=3:2.
$k'_1 = 1.84$.
$\alpha = 1.15$.

EXAMPLE 12

(±)-Cis-permethric acid.
Eluent=toluene:ethyl acetate=3:2.
$k'_1 = 1.63$.
$\alpha = 1.15$.

EXAMPLE 13

(±)-Trans-permethric acid.
Eluent=toluene:ethyl acetate=3:2.
$k'_1 = 2.44$.
$\alpha = 1.12$.

EXAMPLE 14

(±)-Z-Cis-2,2-dimethyl-3-[2-chloro-2-(4-chlorophenyl)vinyl]cyclopropanecarboxylic acid.
Eluent=toluene:ethyl acetate=3:2.
$k'_1 = 1.20$.
$\alpha = 1.21$.

EXAMPLE 15

(±)-Z-Trans-2,2-dimethyl-3-[2-chloro-2-(4-chlorophenyl)vinyl]cyclopropanecarboxylic acid.
Eluent=toluene:ethyl acetate=3:2.
$k'_1=1.85$.
$\alpha=1.13$.

EXAMPLE 16

(±)-E-Trans-2,2-dimethyl-3-[2-chloro-2-(4-chlorophenyl)vinyl]cyclopropanecarboxylic acid.
Eluent=toluene:ethyl acetate=3:2.
$k'_1=2.03$.
$\alpha=1.04$.

EXAMPLE 17

(±)-Cis-2,2-dimethyl-3-(1,2,2,2-tetrachloroethyl)cyclopropanecarboxylic acid.
Eluent=toluene:ethyl acetate=3:2.
$k'_1=1.77$.
$\alpha=1.07$.

EXAMPLE 18

(±)-Trans-2,2-dimethyl-3-(1,2,2,2-tetrachloroethyl)-cyclopropanecarboxylic acid.
Eluent=toluene:ethyl acetate=3:2.
$k'_1=3.51$.
$\alpha=1.13$.

EXAMPLE 19

(±)-3-Formyl-2,2-dimethylcyclopropanecarboxylic acid.
Eluent=toluene:ethyl acetate=3:2.
$k'_1=3.70$.
$\alpha=1.10$.

EXAMPLE 20

Methyl (±)-1,4-dihydro-2,6-dimethyl-5-nitro-4-(2-trifluoromethylphenyl)-pyridine-3-carboxylate.
Eluent=toluene:ethyl acetate=5:1.
$k'_1=5.49$.
$\alpha=1.13$.

EXAMPLE 21

Methyl (±)-4-(2-benzylthiophenyl)-1,4-dihydro-2,6-dimethyl-5-nitro-pyridine-3-carboxylate.
Eluent=toluene:ethyl acetate=3:1.
$k'_1=3.49$.
$\alpha=1.10$.

EXAMPLE 22

(±)-1,4-Dihydro-2,6-dimethyl-5-nitro-4-(2-trifluoromethylphenyl)-pyridine-3-carboxylic acid.
Eluent=toluene:ethyl acetate=1:1.
$k'_1=6.80$.
$\alpha=1.40$.

EXAMPLE 23

5-Methyl ester of (±)-1,4-dihydro-2,6-dimethyl-4-(3-nitrophenyl)-pyridine-3,5-dicarboxylic acid.
Eluent=toluene:ethyl acetate=5:4.
$k'_1=7.60$.
$\alpha=1.23$.

EXAMPLE 24

5-Isopropyl ester of (±)-1,4-dihydro-2,6-dimethyl-4-(3-nitrophenyl)-pyridine-3,5-dicarboxylic acid.
Eluent=toluene:ethyl acetate=5:4.
$k'_1=5.81$.
$\alpha=1.28$.

EXAMPLE 25

5-Methyl ester of (±)-1,4-dihydro-2,6-dimethyl-4-(2-nitrophenyl)-pyridine-3,5-dicarboxylic acid.
Eluent=toluene:ethyl acetate=5:4.
$k'_1=6.50$.
$\alpha=1.42$.

EXAMPLE 26

(±)-1,4-Dihydro-2,6-dimethyl-3-nitro-4-(2-trifluoromethylphenyl)pyridine.
Eluent=toluene:ethyl acetate=5:1.
$k'_1=4.5$.
$\alpha=1.13$.

EXAMPLE 27

5-Ethyl ester of (±)-1,4-dihydro-2,6-dimethyl-4-(2-trifluoromethylphenyl)pyridine-3,5-dicarboxylic acid.
Eluent=toluene:ethyl acetate=5:4.
$k'_1=3.00$.
$\alpha=1.38$.

EXAMPLE 28

2-Cyanoethyl (±)-1,4-dihydro-2,6-dimethyl-5-nitro-4-(2-trifluoromethylphenyl)-pyridine-3-carboxylate.
Eluent=toluene:ethyl acetate=5:1.
$k'_1=6.72$.
$\alpha=1.10$.

(B). Separating column: 1.28 cm diameter, 39 cm packed height, 15 g polymer resin from Example 4

EXAMPLE 29

(±)-cis-chrysanthemic acid.
Eluent=toluene:ethyl acetate=3:2.
$k'_1=1.36$.
$\alpha=1.17$.

EXAMPLE 30

(±)-trans-chrysanthemic acid.
Eluent=toluene:ethyl acetate=3:2.
$k'_1=2.28$.
$\alpha=1.14$.

EXAMPLE 31

(±)-cis-permethrinic acid.
Eluent=toluene:ethyl acetate=3:2.
$k'_1=1.93$.
$\alpha=1.17$.

EXAMPLE 32

(±)-1,4-dihydro-2,6-dimethyl-4-(3-nitrophenyl)-pyridine-3,5-dicarboxylic acid 5-methylester.
Eluent=toluene:ethyl acetate.
$k'_1=7.60$.
$\alpha=1.19$.

EXAMPLE 33

(±)-1,4-dihydro-2,6-dimethyl-4-(2-trifluoromethylphenyl)-pyridine-3.5-dicarboxylic acid 5-ethylester.
Eluent=toluene:ethyl acetate=3:2.
$k'_1=3.61$.
$\alpha=1.45$.

(C) Separating column: 1.26 cm diameter 32 cm packed height, 11 g polymer resin of Example 6

EXAMPLE 34

5-methylester of (±)-1.4-dihydro-2,6-dimethyl-4-(3-nitrophenyl)-pyridine-3.5-dicarboxylic acid.
Eluent=toluene:tetrahydrofurane=3:2.
$k'_1 = 1.00$.
$\alpha = 1,55$.

EXAMPLE 35

Ethylester of (±)-1,4-dihydro-2,6-dimethyl-4-(2-trifluoromethylphenyl)-pyridine-3 5-dicarboxylic acid.
Eluent: toluene:tetrahydrofurane=3:2.
$k'_1 = 0.7$.
$\alpha = 2.50$.

IV. Comparison Example

Methyl (±)-1,4-dihydro-2,6-dimethyl-5-nitro-4-(2-trifluoromethylphenyl)-pyridine-3-carboxylate.

The racemate is chromatographed on a separating column (1.28 cm diameter, packed height 21 cm) which contains 10 g of a copolymer of the (S)-1-phenylethylamide of methacrylic acid and 1,2-ethylene glycol dimethacrylate. The eluting agent used is a mixture of toluene and ethyl acetate (5:1, v/v).

When, in a chromatographic resolution of a racemate, the eluate is measured simultaneously with a concentration-dependent detector—for example a photometer—and a polarimeter to determine the optical activity, the optical yield P can be calculated from the ratio of the areas on the two detector curves by the following equation:

$$P = \frac{F_\alpha}{C \cdot F_E} \text{ ; with}$$

$F_\alpha$ = area of the polarimeter chromatogram
$F_E$ = area of the photometer chromatogram $$C = \frac{S_{\alpha(+)}}{S_{E(+)}} = \frac{S_{\alpha(-)}}{S_{E(-)}}$$

$S_{\alpha(+)}, S_{E(+)}$ = excursion of the recorder for the polarimeter and photometer, respectively, for an eluate fraction which contains the pure (+)-enantiomer.

$k'_1 = 15.6$.
$\alpha = 1.10$.
Optical yield: 50%.

The optical yield is considerably lower than on resolution of the racemate on a polymer according to the invention (from Example 4), with which an optical yield of 71% is obtained (for separating conditions, see Example 20).

It will be understood that the specification and examples are illustrative but not limitative of the present invention and that other embodiments within the spirit and scope of the invention will suggest themselves to those skilled in the art.

We claim:

1. An optically active (meth)acrylamide monomer of the formula $$H_2C=C\begin{matrix}R^1\\\\C-NH-R^2\\\parallel\\O\end{matrix}$$

in which
$R^1$ represents hydrogen or methyl, and
$R^2$ represents one of the stereoisomers of the eight possible stereoisomeric forms of each of the optically active radicals of the formulae

[menthyl structure] or [neomenthyl structure]

2. A compound according to claim 1, in which
$R^1$ represents hydrogen or methyl, and
$R^2$ represents one stereoisomer of the eight possible stereoisomeric forms, in each case, of the optically active radical of the structural formula

[menthyl structure]

3. A monomer according to claim 1 which is one stereoisomeric form of l-menthyl(meth)acrylamide.

4. A monomer according to claim 1 which is one stereoisomeric form of d-menthyl(meth)acrylamide.

5. A monomer according to claim 1 which is one stereoisomeric form of d-neomenthyl(meth)acrylamide.

6. An optically active and vinyl cross-linked polymer containing the repeating structural unit $$-[-CH_2-CR^1]-\\\quad\quad|\\\quad\quad C\\\quad O^{\nearrow}\,^{\searrow}NHR^2$$

in which
$R^1$ represents hydrogen or methyl, and
$R^2$ represents one of the stereoisomers of the eight possible stereoisomeric forms of each of the optically active radicals of the formulae

[menthyl structure] or [neomenthyl structure]

7. An optically active and cross-linked polymer according to claim 6 with the following properties:

Degree of swelling $\left[\dfrac{\text{Volume swollen}}{\text{Volume unswollen}}\right]$: 1.1–5;

measured in toluene/ethyl acetate (ratio by volume 3:2),
bulk volume[ml/g]: 1.52–2.5;
particle size distribution: 1–500;
nitrogen content [%] (without N in the crosslinker): 3.5–6.3,
nitrogen content [%] (with N in the crosslinker): 6.3–13.

8. A copolymer consisting essentially of monomer units according to claim 6 and 0.5 to 50 mol % of monomer units of a cross-linking agent.

9. A copolymer according to claim 8, containing 1 to 20 mol % of monomer units of the cross-linking agent.

10. A copolymer according to claim 8, containing 5 to 15 mol % of monomer units of the cross-linking agent.

11. A copolymer according to claim 8, wherein the cross-linking agent is a monomer containing two vinyl groups.

* * * * *

UNITED STATES PATENT AND TRADEMARK OFFICE
CERTIFICATE OF CORRECTION

PATENT NO. : 4,931,525

DATED : June 5, 1990

INVENTOR(S) : Schwartz et al.

It is certified that error appears in the above-identified patent and that said Letters Patent is hereby corrected as shown below:

Col. 13, claim 7  After " distribution " insert -- [ µm ] --
line 11

Signed and Sealed this

Twenty-eighth Day of January, 1992

Attest:

HARRY F. MANBECK, JR.

*Attesting Officer*  *Commissioner of Patents and Trademarks*